United States Patent [19]

Jonischus

[11] Patent Number: 5,035,154
[45] Date of Patent: Jul. 30, 1991

[54] ADJUSTMENT MECHANISM FOR A FRICTION DRIVE UNIT

[75] Inventor: Jürgen Jonischus, Romanshorn, Switzerland

[73] Assignee: Düpro AG, Romanshorn, Switzerland

[21] Appl. No.: 508,941

[22] Filed: Apr. 13, 1990

[30] Foreign Application Priority Data

Apr. 15, 1989 [DE] Fed. Rep. of Germany ....... 3912493

[51] Int. Cl.⁵ ............................................. B62D 61/00
[52] U.S. Cl. ..................................... 74/213; 411/508; 411/913
[58] Field of Search ...................... 411/508, 913, 510; 74/211, 213, 571 M, 207, 209

[56] References Cited

U.S. PATENT DOCUMENTS

| D. 293,880 | 1/1988 | Takahashi | 411/508 X |
| 409,193 | 8/1889 | Griscom | 74/213 |
| 2,531,989 | 11/1950 | Prince et al. | 74/213 |
| 2,739,551 | 3/1956 | Rabezzana | 74/211 X |
| 2,859,848 | 11/1958 | Bade | 74/211 X |
| 2,861,643 | 11/1958 | Wald, Jr. et al. | 74/213 X |

Primary Examiner—Richard E. Moore
Attorney, Agent, or Firm—Robert W. Becker and Associates

[57] ABSTRACT

An adjustment mechanism for a friction drive unit. To adjust the contact pressure between the friction wheel and a cooperating wheel of the friction drive unit, one of these wheels is mounted on a lever that is pivotable about a pivot axis. A cam that applies the contact pressure rests against the lever. The spacing of the cam relative to the pivot axis of the lever is variable.

15 Claims, 2 Drawing Sheets

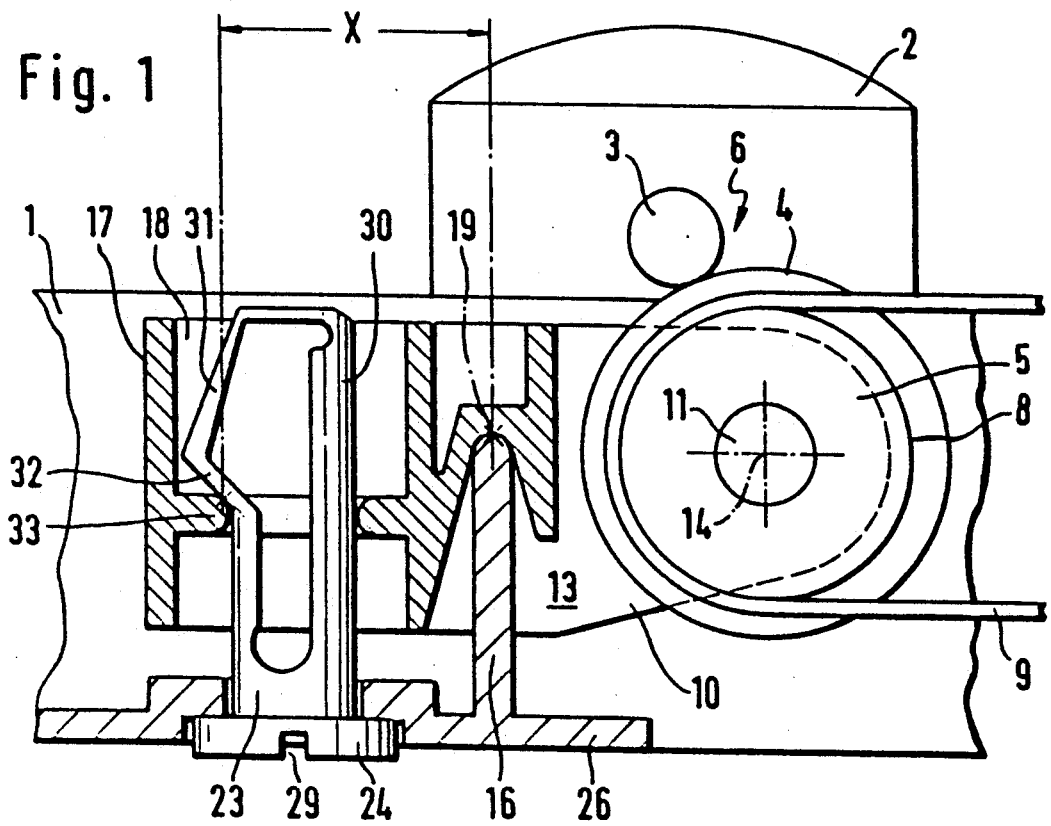
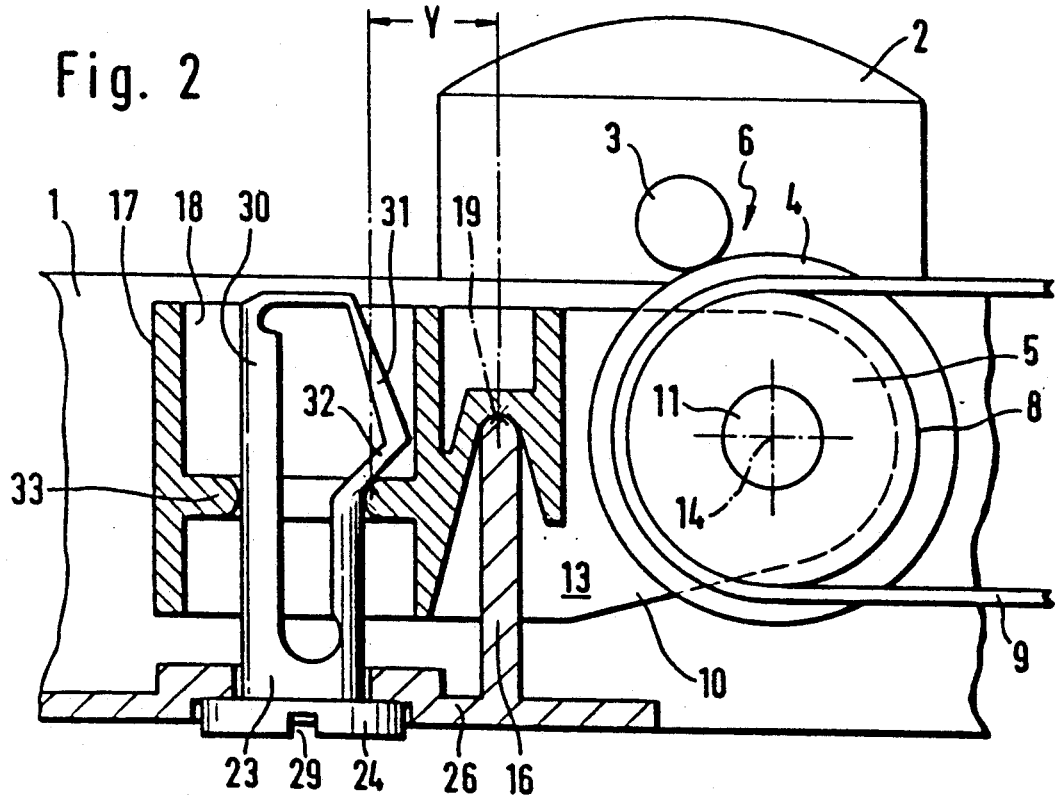

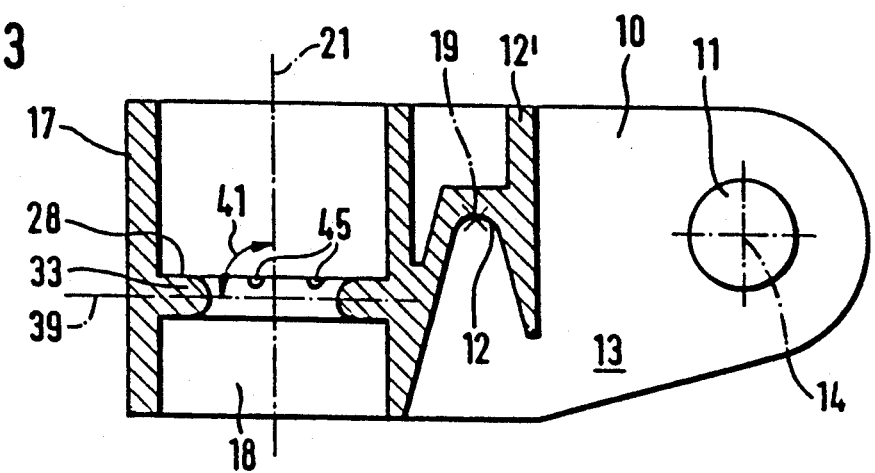
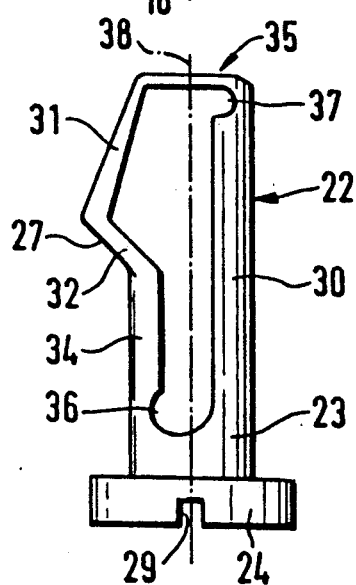
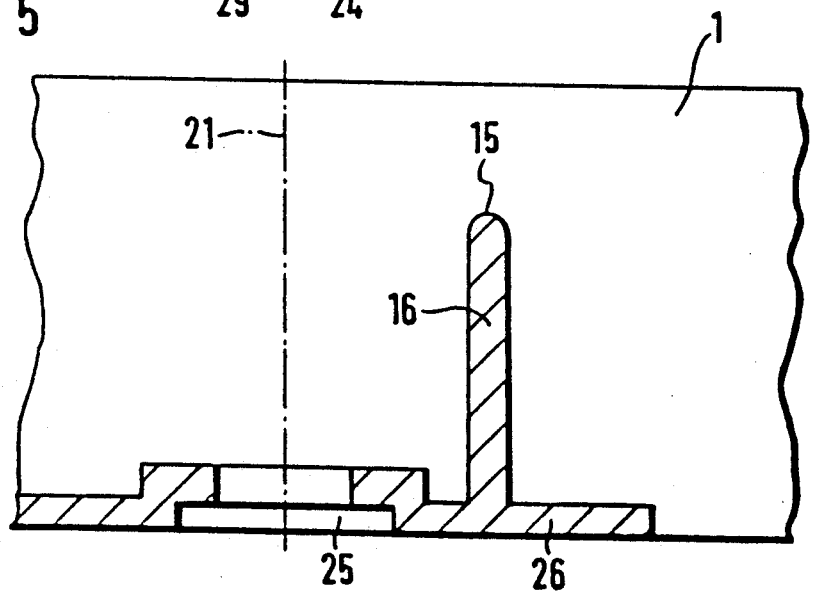

ADJUSTMENT MECHANISM FOR A FRICTION DRIVE UNIT

BACKGROUND OF THE INVENTION

The present invention relates to an adjustment mechanism for a friction drive unit, especially for a friction drive unit of a vacuum tool of a vacuum cleaner; to adjust the contact pressure between the friction wheel and a cooperating wheel of the friction drive unit, one of the wheels of the friction drive unit is mounted on a lever that is pivotable about a pivot axis.

In a friction drive unit, the peripheral surface of a friction wheel is pressed against the peripheral surface of a cooperating wheel (a drive wheel). The surfaces of the wheels that contact one another are embodied and paired in such a way that a high frictional engagement is achieved in order to obtain an as nonslip a transfer as possible of a maximum torque at a minimum contact pressure.

In order to establish an optimum contact pressure, it is known, for example, to dispose the drive motor of the friction drive unit on an adjustable mounting, with the position of the mounting being adapted to be varied by spring force, set screws, or other adjustment means in such a way that the drive wheel that is secured to &he motor shaft can be pressed against the wheel that is to be driven with that force that is required to transfer the desired torque.

It is also known to shift the spacing of the driven wheel relative to the stationary drive wheel using appropriate adjustment means in order to establish the desired contact pressure for achieving the required frictional engagement.

All of the known adjustment means have very complicated constructions and are complicated to operate. Although these known adjustment means are generally suitable for large industrial applications, they are hardly suitable for small-scale commercial use or for household use. The handling and operation of these known adjustment mechanisms are particularly cumbersome for the ultimate user.

It is therefore an object of the present invention to provide for the pair of wheels of a friction drive unit an adjustment mechanism that has a straightforward construction, is easy to adjust can be mass produced in an economical manner, and ensures a simple handling and operation.

BRIEF DESCRIPTION OF THE DRAWINGS

This object, and other objects and advantages of the present invention, will appear more clearly from the following specification in conjunction with the accompanying schematic drawings, in which:

FIG. 1 is a partially cross-sectioned side view of one exemplary embodiment of the inventive adjustment mechanism of a friction drive unit;

FIG. 2 is a view of the adjustment mechanism of FIG. 1 with an altered lever arm;

FIG. 3 is a partially cross-sectioned side view of a two-armed lever of the mechanism;

FIG. 4 shows the adjustment member of the adjustment mechanism; and

FIG. 5 is a fragmentary cross-sectioned view through the housing of the adjustment mechanism.

SUMMARY OF THE INVENTION

The adjustment mechanism of the present invention is characterized primarily in that a cam that applies the contact pressure rests against the ever, with the distance of the cam from the pivot axis of the lever being variable.

Providing the operating force that applies the contact pressure by means of a cam makes it possible to have a straightforward structural configuration that permits the use of economical mass production. The effective lever arm can be easily altered by shifting the cam on the lever, thus making it possible to have a sensitive adjustment of the desired contact pressure; this adjustment could also be reliably carried out by a layman.

Pursuant to one advantageous specific embodiment of the present invention, the cam is part of an adjustment bolt and projects from the surface thereof. The adjustment bolt is held in a housing of the adjustment mechanism in such a way that the adjustment bolt can be rotated about its longitudinal axis, so that merely by rotating the adjustment bolt, it is possible to alter the position of the cam relative to the pivot axis of the lever.

The cam is preferably connected via a first spring clip with the head region of the adjustment bolt, and is connected via a second spring clip with the free end of the shaft of the adjustment bolt, so that the force of the cam that provides the contact pressure is applied via the spring clips.

Further specific features of the present invention will be described in detail subsequently.

DESCRIPTION OF PREFERRED EMBODIMENTS

Referring now to the drawings in detail, the housing 1 of the adjustment mechanism is preferably integrally formed with the housing of a suction tool of a vacuum cleaner. Provided in this housing (FIGS. 1 and 2) is a non-illustrated rotating brush that is driven by an electric motor 2 via a friction drive unit 6. The drive wheel 3, which is disposed on the shaft of the electric motor 2, rests against the friction coating 4 of a friction wheel 5. The driven friction wheel 5 has a centrally disposed, smaller diameter, annular contact surface 8 on its outer surface. Disposed on the contact surface 8 is a drive belt 9 that rotatably drives the non-illustrated brush.

The friction wheel 5 projects radially beyond both sides of the contact surface 8. In addition, the friction wheel 5 is disposed higher than the drive belt 9 when it is placed upon the contact surface 8 and forms two annular surfaces for the friction coating 4. To achieve a nonslip drive, the friction wheel 5 is pressed against the drive wheel 3 of the electric motor 2.

To establish the required contact pressure, the distance of the friction wheel 5 from the drive wheel 3 is adjustable. For this purpose, either the drive wheel 3 or the driven friction wheel 5 could be shifted. In the illustrated embodiment, the distance of the friction wheel 5 from the drive wheel 3 can be varied.

In the embodiment illustrated in FIGS. 1 and 2, the friction wheel 5 is disposed at the end of a two-armed lever 10 (see also FIG. 3) that is mounted approximately in the middle of the length thereof. A support recess 12 is preferably provided on the lever 10; by means of this support recess 12, the lever 10 rests upon the rounded end 15 (FIG. 5) of a support element 16 that is secured to the housing or is integral therewith. The support element 16 and the rounded end 15 thereof extend parallel to the axis of rotation of the friction wheel 5. The radius of curvature of the rounded end 15, and the radius of curvature of the support recess 12, are coordinated with one another in such a way that a sort of "knife-edge support" is formed. As a result, the lever 10 can execute a limited pivoting movement about the rounded end 15 of the support element 16. The pivot axis 19 extends parallel to the axis of rotation of the friction wheel 5. The support recess 12 extends about the rounded end 15 on all sides, so that the lever 10 cannot shift relative to the support element 16.

The lever 10, which as shown in FIG. 3 preferably has a two-arm configuration, comprises a side wall 13, in the center of the length of which is provided a portion 12' of the housing that forms the support recess 12. Provided at one end of the lever 10 is a support pin 11 for mounting the friction wheel 5 and for determining the axis of rotation 14 thereof. This axis of rotation 14 is disposed perpendicular to the side wall 13, as is the pivot axis 19 of the lever 10 that is defined by the support recess 12. That end 17 of the lever 10 that is opposite from the pin 11 is provided with a housing portion that has a receiving bore 18, the central axis 21 of which is disposed in a plane that is parallel to the side wall 13. The central axis 21 of the receiving bore 18 is preferably disposed at right angles to the longitudinal central axis of the lever 10.

An internal annular flange 33 is arranged in the receiving bore 18, which as mentioned previously is disposed at the end 17 of the lever 10. The plane 39 of the annular flange 33 is preferably disposed at a right angle 41 relative to the central axis 21.

It can be advantageous to dispose the annular flange 33 in such a way that its plane 39 is disposed at an angle relative to the central axis 21 that differs from the right angle 41.

Disposed in the receiving bore 18 is a shaft 22 of an adjustment member that is embodied as the adjustment bolt 23, the head 24 of which is at least partially disposed in a recess 25 of a wall 26 of the housing 1 (see FIG. 5). In order to rotate the adjustment bolt 23 about its longitudinal axis 38, the head 24 of the bolt is preferably provided with a slot 29 into which a tool, such as a screwdriver, a coin, or the like can extend.

As shown in FIG. 4, the shaft 22 of the adjustment bolt 23 is formed from a rigid, axial guide portion 30 and spring clips 31, 34. The rigid guide portion 30 has an approximately semicircular configuration. The first spring clip 34 extends from the head 24 to approximately half the length of the shaft 22 and parallel to the guide portion 30. Connected to the spring clip 34 at approximately half the length of the shaft is a cam 32 that projects from the surface of the shaft 22 and extends at an angle toward the outside. Connected to the free end of the cam 32 is the second spring clip 31, which extends radially inwardly at an angle to the free end 35 of the shaft.

The height of the support elements 16 (see FIG. 5) and the length of the shaft 22 (see FIG. 4) are coordinated with one another in such a way that the surface 27 of the cam 32 that faces the head 24 of the adjustment bolt 23 rests against that surface 28 of the annular flange 33 that is remote from the head 24. Thus, the annular flange 33 is disposed between the head 24 of the adjustment bolt 23 and the cam 32. By rotating the adjustment bolt 23 about its longitudinal axis 38, the cam 32, which rests upon the annular surface 28, is disposed in a position (FIG. 1) where a large distance X exists to the pivot axis 19 of the lever 10, and in another position where a minimum distance Y exists to the pivot axis 19 of the lever 10 (FIG. 2). Between these two positions, any desired position for adjusting this distance is possible. By changing the distance, the lever arm between the cam 32 and the pivot axis 19 is varied from its maximum length X to its minimum length Y, as a result of which the contact pressure of the friction wheel 5 that is mounted at the other end of the lever 10 is varied.

The contact pressure that is exerted due to the spring action of the springs 31 and 34 by the cam 32 upon the annular flange 33 is retained during rotation of the adjustment bolt 23, the axis of which preferably remains unchanged. However, by changing the lever arm, the contact pressure of the friction wheel 5 against the drive wheel 3 can be sensitively adjusted.

The connection zones of the spring clips 31 and 34 to the guide portion 30 of the adjustment bolt 23 are accomplished via semicircular weak points 36 and 37. The elasticity that is achieved in this manner enables an elastic deformation of the spring clip 31 in a radial direction for the insertion of the adjustment bolt 23 into the receiving bore 18 on the lever 10 during installation of the adjustment bolt 23. The elastic deformation of the spring clips 31 and 34 when the friction wheel 5 rests against the drive wheel 3 makes the required contact pressure available.

To prevent the adjustment bolt 23 from turning unintentionally, for example due to vibrations during operation of the apparatus, the annular surface 28 can be provided with notches 45 in which the cam 32 catches.

The inventive design of the adjustment bolt 23 enables a one-piece manufacture as a cast or molded plastic part having the shaft 22, the head 24, the spring clips 31 and 34, and the cam 32. Similarly, the lever 10 can be produced as a single plastic part, as can the housing 1 of the adjustment mechanism, which is preferably integrally formed with the housing of the vacuum cleaning tool. In so doing, a straightforward manufacture and assembly of the adjustment mechanism is achieved while providing a very simple setting of the contact pressure for the friction drive unit.

Instead of the two-armed lever 10 described in conjunction with the illustrated embodiment, it can be expedient to provide a one-arm lever. However, in so doing care must be taken that when disposing a resilient adjustment bolt between the axis of rotation 14 of the friction wheel 5 and the knife-edge support 12/15, the applied force acts in the sense of a reduction of the spacing between the friction wheel and the drive wheel.

The present invention is, of course, in no way restricted to the specific disclosure of the specification and drawings, but also encompasses any modifications within the scope of the appended claims.

What I claim is:

1. In an adjustment mechanism for a friction drive unit, whereby to adjust the contact pressure between a friction wheel and a cooperating wheel of said friction drive unit, one of said wheels of said friction drive unit is mounted on a lever that is pivotable about a pivot axis, the improvement comprising:

a housing;

cam means that rests against said lever for applying said contact pressure; and means for shifting the distance of said cam means from said pivot axis of said lever, with said means for shifting the distance of said cam means being an adjustment bolt that has a longitudinal axis and is held in said housing in such a way as to be rotatable; and with said cam means being a part of said adjustment bolt and resiliently projecting from a surface thereof.

2. An adjustment mechanism according to claim 1, in which said adjustment bolt includes a shaft to which is connected at least one spring clip, via which said cam means is held.

3. An adjustment mechanism according to claim 2, which includes two spring clips, and in which said shaft has two ends, at one of which is disposed a head and the other of which is free, with said cam means being connected to said head region of said shaft via a first one of said spring clips, and being connected to said free end of said shaft via a second one of said spring clips.

4. An adjustment mechanism according to claim 5, in which transition zones between said spring clips and said shaft are provided by weak points that form joints.

5. An adjustment mechanism according to claim 3, in which said lever is provided with an annular flange that extends about said shaft of said adjustment bolt, with said flange having a cooperating surface against which said cam means rests.

6. An adjustment mechanism according to claim 5, in which said lever is provided with a receiving bore for receiving said adjustment bolt, with said annular flange being disposed in said receiving bore.

7. An adjustment mechanism according to claim 6, in which said cam means is disposed at an angle relative to said longitudinal axis of said adjustment bolt.

8. An adjustment mechanism according to claim 6, in which said shaft and head of said adjustment bolt, and said spring clips and cam means, are all a single component.

9. An adjustment mechanism according to claim 6, in which said housing is provided with a rounded support means, and in which said lever is provided with a support recess that extends in the direction of said pivot axis of said lever and engages said rounded support means.

10. An adjustment mechanism according to claim 9, in which said support recess engages said rounded support means on all sides.

11. An adjustment mechanism according to claim 9, in which said support recess and said rounded support means form a sort of knife-edge support.

12. An adjustment mechanism according to claim 6, in which said lever is embodied as a two-armed lever, at one end of which is mounted said friction wheel, and at an opposite end of which is disposed said receiving bore with said adjustment bolt.

13. An adjustment mechanism according to claim 6, in which said angular flange is disposed at an angle relative to a central axis of said receiving bore.

14. An adjustment mechanism according to claim 13, in which said angle is 90°.

15. An adjustment mechanism for a friction drive unit of a vacuum tool of a vacuum cleaner, with said friction drive unit including a friction wheel and a cooperating wheel, whereby one of said wheels is mounted on a lever that is pivotable about a pivot axis, said adjustment mechanism comprising:

resiliently supported cam means that acts upon said lever and rests against same with preload for applying contact pressure between said wheels of said friction drive unit; and means for varying the distance of said cam means from said pivot axis of said lever.

* * * * *